United States Patent [19]

Perry

[11] Patent Number: 4,494,973
[45] Date of Patent: Jan. 22, 1985

[54] TAKE-OUT ARM FOR BOTTLE FORMING MACHINE

[75] Inventor: Jack I. Perry, Sylvania, Ohio

[73] Assignee: Owens-Illinois, Inc., Toledo, Ohio

[21] Appl. No.: 501,689

[22] Filed: Jun. 6, 1983

[51] Int. Cl.³ .............................................. C03B 9/44
[52] U.S. Cl. ..................................... 65/260; 414/709; 414/719; 414/736
[58] Field of Search .................. 65/260; 414/736, 719, 414/709, 752

[56] References Cited

U.S. PATENT DOCUMENTS 1,795,665  3/1931  Miller .................................... 65/260
4,261,724  4/1981  Sarkozy ................................ 65/260
4,299,533  10/1981 Ohnaka ............................... 414/752

FOREIGN PATENT DOCUMENTS 2061872  5/1981  United Kingdom ................ 414/917

Primary Examiner—Robert Lindsay
Attorney, Agent, or Firm—Gerald T. Welch; Myron E. Click

[57] ABSTRACT

There is herein disclosed a take-out arm mechanism for a glass forming machine particularly suited for the simultaneous handling of four or more containers wherein the arm is provided with an integrally molded and formed counterweight carried thereby to counteract the weight and mass of four take-out tongs, holders and attendant mechanisms. In addition, a novel tensioning means is provided for maintaining an adjustable, constant tension in an endless chain which extends between a pair of sprockets carried within the take-out arm. The sprockets and the chain together form, in essence, a parallel linkage mechanism which maintains the tong holder end of the take-out arm vertical relative to the movement of the arm through 180° about the axis of the fixed spindle.

15 Claims, 5 Drawing Figures

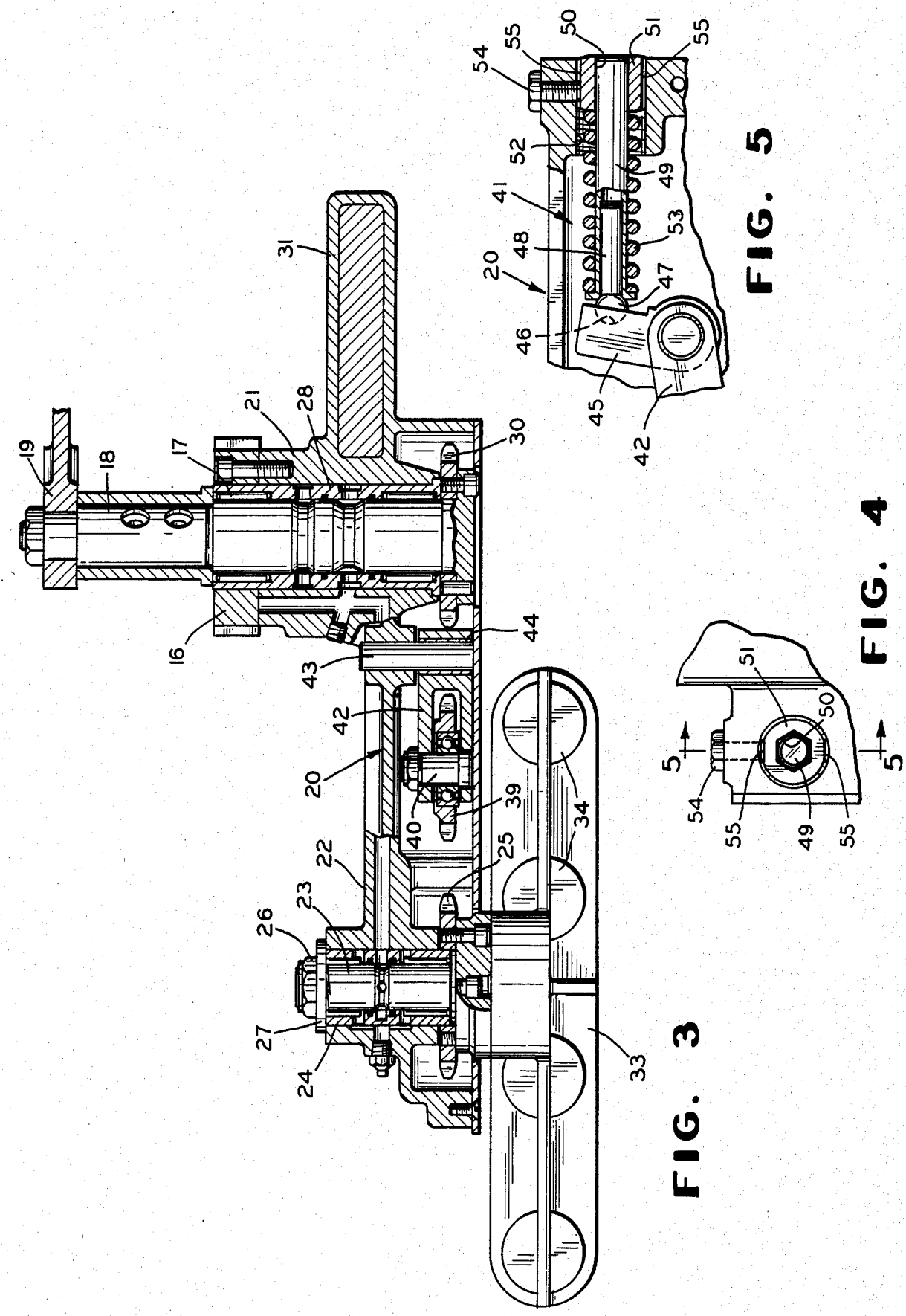

TAKE-OUT ARM FOR BOTTLE FORMING MACHINE

BACKGROUND OF THE INVENTION

This invention relates to an improved take-out arm for a bottle forming machine.

A typical glass forming machine, such as the Hartford IS machine, has several reciprocating members which are pneumatically operated by reciprocating motors. An example of a Hartford IS machine and the mechanisms which are contained thereon may be found in U.S. Pat. No. 1,911,119. In the operation of such a machine, and as is clearly shown in FIG. 4 of this patent, a take-out mechanism 280 is operated by a separate pneumatic motor. This pneumatic motor, as it reciprocates, drives a pinion from the rack that is a part of the motor. The pinion in turn is connected to the take-out arm of the mechanism. After the ware has been formed in such a machine, the ware is moved from the blow mold to an adjacent dead plate where the ware is cooled. The movement of the ware from the blow mold to the dead plate is effected by a take-out mechanism, generally designated C in the above referred to patent. When these take-out mechanisms, such as that shown in the above referred to patent, were used for transferring one or two bottles at a time from the blow mold to the cooling dead plate, the operation of the arm was fairly smooth. Furthermore, the movement of the take-out arm and of the mechanism for driving the take-out arm normally is cushioned so that the movement is controlled, particularly at the position of pickup and the position of release over the dead plate. Such a patent is U.S. Pat. No. 4,298,373. This patent discloses a mechanism for cushioning the end movements of this take-out arm mechanism.

It should be apparent that it is very important, when the take-out arm is moved into position to grasp the bottles at the blow molds, that the arm, and the tong mechanism which is carried at the outer end of the arm, be relatively steady. As stated, this was not a problem when the arm carried perhaps one or two sets of take-out tongs. With the advent, however, of machines which now are operating to simultaneously move four containers at a time from a blow mold that has four cavities, the operation of the take-out mechanism becomes much more subject to vibration at the end of its stroke. Vibration can occur at the position where the four sets of take-out tongs are to engage and grasp the bottles at the blow mold station and then after transfer at the dead plate. When dealing with take-out mechanisms where there are four sets of tongs, there is considerable mass to this mechanism which is carried at the outer end of the take-out arm. This mass, acting through the length of the take-out arm, will create forces at the end of the arm which may cause the arm to vibrate to such an extent that the tongs carried by the arm will chatter against the finish of the newly formed containers. Such chattering or touching of the tongs against the finish may produce checks in the finish of the containers. Obviously, producing checks in the finish of the containers is something that is to be avoided.

With the foregoing views, it is an object of the present invention to provide a take-out arm for a bottle forming machine in which the take-out arm is provided with a compact and effective counterweight which will offset the excessive weights of the plural tong mechanisms that are carried at the end of the take-out arm.

It is a further object of this invention to provide a take-out arm mechanism which may be adjusted to remove slack in the drive system caused by wear. The extent of adjustment that may be made is monitored.

It is a still further object of this invention to provide a mechanism for maintaining the tension on a drive chain in the take-out arm at a preselected and predetermined value.

Other and further objects will be apparent from the following description.

SUMMARY OF THE INVENTION

A take-out apparatus for moving a plurality of newly formed glass articles from the blow mold to a cooling dead plate in which the take-out arm, which is pivotally connected to a horizontal shaft intermediate the blow mold and the dead plate, is formed as a horizontally extending casting. The casting serves as the arm and supports a pair of sprockets which are positioned adjacent to each end of the arm. An endless chain is engaged with the sprockets, with means for maintaining a predetermined tension in the chain. Plural take-out tongs are mounted to the sprocket that is not driven and counterweight means is connected to the arm and extends in the opposite direction to the take-out tongs relative to the rotational axis of the arm.

BRIEF DESCRIPTION OF THE DRAWINGS

FIG. 3 is a cross-sectional view taken at line 3—3 of FIG. 1;

FIG. 4 is an end view of the chain tension adjusting mechanism of the invention; and, FIG. 5 is a cross-sectional view of the chain tensioning mechanism taken at line 5—5 of FIG. 4.

DETAILED DESCRIPTION OF THE DRAWINGS

Figure 1:
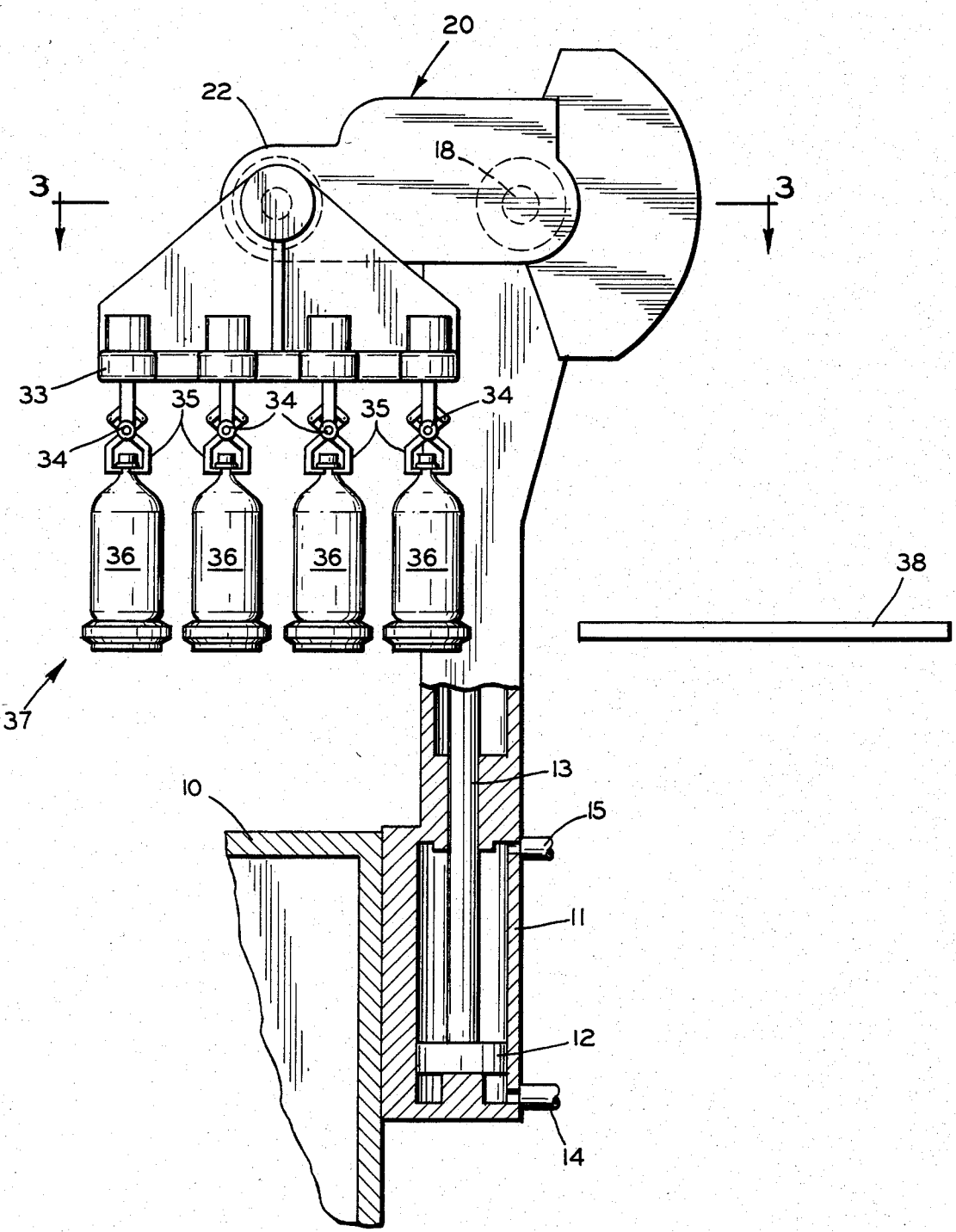
FIG. 1 is a schematic side elevational view, partly in section, of the take-out mechanism of a glass forming machine.

With particular reference to FIG. 1, there is schematically illustrated a lower support 10 of a glassware forming machine to which is attached a pneumatic motor 11. The motor 11 carries a piston 12 therein which drives a rod 13 with vertical, reciprocating motion in response to introduction of fluid under pressure to the lines 14 and 15 connected thereto. Vertical reciprocation of the rod 13, the upper end of which is a rack, will cause rotation of a pinion 16, seen in FIG. 3. The pinion 16 is supported by bearings 17 on a horizontal support shaft 18. The shaft 18 is bolted to a vertical, fixed support member 19. The pinion 16 is bolted to a main arm casting 20.

The casting 20, as best seen in FIG. 3, has a hub portion 21 that is supported by the shaft 18. The hub 21 is formed integral with an outstanding arm portion 22. This arm portion 22 constitutes the take-out arm of a take-out mechanism. To the left, as viewed in FIGS. 2 and 3, the arm portion 22 of the casting 20 is provided with a fixed horizontally extending shaft 23. The shaft 23 supports a rotatable sleeve 24. The sleeve 24 at its forward end supports a sprocket 25. The sprocket 25 is fixed to the shaft 23 and the shaft 23 is held in the casting by a threaded nut 26 which seats against a washer 27. The washer 27 in turn will bear against the end of the sleeve 24 and the edge of the opening in the arm portion 21. It should be realized that the sleeve 24 does not rotate, but the shaft 23 rotates within the sleeve as the mechanism is operated. By contrast thereto, the hub portion 21 of the arm 20 rotates about the fixed shaft 18. A bearing sleeve 28, coaxially positioned with respect to the shaft 18, rotates with the arm 20 and its hub 21. An endless chain 29 extends around the sprocket 25 and also around the sprocket 30 carried at the inner end of the fixed shaft 18. The sprocket 30 does not rotate but is held stationary, as is the shaft 18, when the mechanism is operated.

Figure 2:
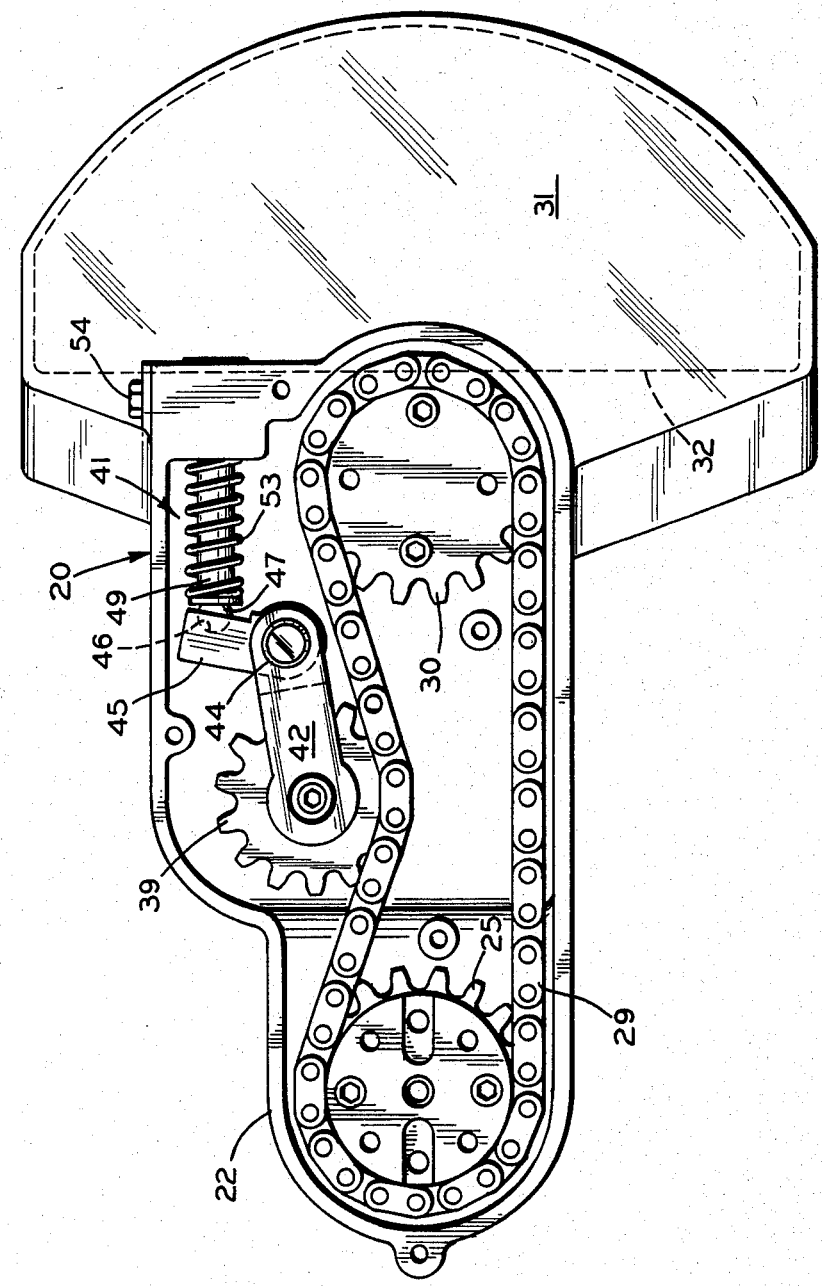
FIG. 2 is a side elevational view of the take-out arm of the invention with its coverplate and tong holders removed.

As can be seen in FIGS. 2 and 3, the arm 20 is formed with a lead-filled sector 31. The sector 31 is hollowed out, as can be seen in FIGS. 2 and 3, where the dotted line 32 serves as an outline of the vertical extent of the space formed therein. It thus can be seen that the lead-filled sector 31 extends to the right side of the axis of shaft 18 in direct opposition to the casting arm 20, and thus serves as a counterweight balancing the weight of the arm and the tongs which are carried thereby. The sprocket 25 has an elongated take-out head 33 connected thereto, as perhaps best shown in FIG. 1. The take-out head 33 has a plurality of, in this case four, take-out tong actuating mechanisms 34 connected thereto. The details of the tongs and their actuating mechanism do not constitute any part of the invention in this case and reference may be had to U.S. Pat. No. 4,379,581, issued Apr. 12, 1983, of common assignee for such details. The disclosure of this U.S. Pat. No. 4,137,061 is incorporated herein by reference. The tong actuating mechanisms 34 are adapted to operate sets of tongs 35 to grip the necks of containers 36 and move them from the mold location 37 to a cooling dead plate 38.

In the operation of the take-out arm of the invention, there is the possibility that the chain 29 and sprockets 30 and 25 may become worn and in which case it would be desirable to take up any slack which may be formed due to stretching or wear. With this in mind, a sprocket 39, rotatably mounted on a horizontal shaft 40, is biased in contact with the chain 29 by a biasing mechanism generally designated as 41. The shaft 40 is supported between the ends of a bifurcated arm 42, which in turn is pivoted on a horizontal shaft 43 fixed to the casting 20. The arm 42 is mounted to the shaft 43 by sleeve bearing 44. The arm 42 has a generally right angle crank arm portion 45. The arm 45 is formed with a ball socket 46 therein within which a tooling ball 47 is positioned. The tooling ball 47 is fixed to the end of a horizontally extending shaft 48. The shaft 48 is seated within the hollow end of rod assembly 49. Rod assembly 49, at its right hand side as viewed in FIG. 5, is a solid cylinder. The solid end of rod assembly 49 extends through a hexagonal opening 50 in an externally threaded nut 51. The nut 51 threads into a threaded opening 52 of the casting 20. The threaded nut 51 serves as an abutment for a helical spring 53 which extends from the nut 51 to a radial flange on the rod 49. Thus it can be seen that the spring 53 biases the rod 49 and the ball 47 to the left, as viewed in FIG. 2, maintaining a force on the take-up sprocket 39. By having the rod assembly 49 extending through the hex opening in the nut 51 it can be seen that, as long as the spring bias on the sprocket 39 is of a force sufficient to hold the rod assembly in the position shown in FIG. 5, it would be impossible to insert a hex wrench into the hex opening in the nut 51. This indicates that biasing of the chain 29 is of a predetermined force. However, if the rod assembly 49 were to move to the left under the force of the spring 53 due to stretching or loosening of the chain 29, the inner, hexagonal, wrench engaging portion of the nut 51 would be exposed. This would indicate that the take-up force is less than desired. The adjustment of this nut 51 can be accomplished by rotation of the nut with a hex wrench to the extent that the opening within the interior of the nut 51 is not occupied by the rod assembly 49. This adjustment would be made by first loosening a jamb screw 54, whose inner end is seated within a shallow groove 55 formed in the threaded outer surface of the nut 51. As best seen in FIG. 4, there are two diametrically opposed grooves 55 within which the jamb screw 54 may be positioned. Thus it can be seen that when the tension on the chain 29 has become less than that desired, the rod assembly 49 will be moved under the spring force to the left, as viewed in FIG. 5. At this time the jamb screw 54 is loosened and the hex opening 50 is engaged by a wrench and the nut 51 is rotated until the wrench is forced out of the nut. It should be rotated so that one or the other of the grooves 55 is in alignment with the jamb screw, then the jamb screw is moved back down and tightened to prevent accidental rotation of the nut 51 during operation. This then repositions the inner end of the nut which serves as the abutting surface for the spring 53, thus restoring the length of the spring to that which it had initially, and in this way the biasing force of the spring against the arm 45 and thus the sprocket 39 will be adjusted to a predetermined level.

With the mechanism described, it can be seen that the chain which connects the sprockets 25 and 30 together, and the sprockets themselves, form a parallel linkage mechanism. Thus the take-out tongs will remain in an upright attitude as the arm moves through its 180° cycle of operation to move containers from the molds to the dead plate. The containers are transported by their necks, and they remain upright during this transfer.

The take-out mechanism described above in detail is shown as handling four glass containers at a time. It should be readily apparent that, in the event more than four containers are to be handled, the principal of the invention would still apply. Further, it would be advantageous to use the principal of the invention in all cases where the mass of the arm and the tongs, with consideration for the mass of the glass, may become a problem.

Another consideration is that with the advent of quadruple bottle forming machines, the length of the take-out arm also must be increased. This added length, of course, results in a greater moment of inertia about the axis of the arm. The tongs carried by the arm, being four in number, also increase the mass carried by the end of the arm. All of these factors would contribute to what might be the expected result that the machine must be run slower. By having a counterweight for the arm, the air motor for the operating arm can be the same size as the conventional motor used in the past for operating the take-out arm for a double gob forming machine. The size of the motor does not need to be larger because the force required to start the movement of the arm is reduced because of the counterweight. This results in a saving in compressed air consumption if the motor were to be scaled up to accommodate the quadruple tong mechanism.

In the operation of any glass forming machine it is the speed with which the machine may be operated that is important. The take-out arm operation may be one of the limiting factors in the speed of operation of an I.S. machine in that the bottles must be cleared from the open blow molds before the parisons can be transferred to the molds and the molds closed thereabout. Therefore, the time necessary to start the take-out movement is important. At the end of the cycle of movement of the arm, the arm must decelerate and the tongs open to set the bottles on the dead plate.

As the arm begins the movement from the blow mold, clockwise rotation about the fixed sprocket 30 in FIG. 2, the tongs suspended from the sprocket 25 would tend to resist the motion and apply a tension to the chain between the two sprockets. When the arm arrives at the other end of its movement at the dead plate location, the tongs would have a tendency to rotate the sprocket 25 in a counter-clockwise direction. This pendulum force created by the tongs will be resisted by the tension in the spring 53 acting against the upper run of the chain. Thus, it can be seen that the tension in the chain caused by the spring 53 should be equal to or greater than the pendulum force created by the tongs on the tong supporting structure connected to the sprocket 25.

I claim:

1. A take-out apparatus for moving a plurality of newly formed glass articles from the blow mold to a cooling dead plate, comprising a support positioned intermediate the mold and dead plate, a fixed, horizontal shaft extending from said support, a take-out arm pivotally connected to said shaft, said arm comprising a horizontally extending casting, means pivotally supporting one end of said arm on said shaft, a first vertical member fixed to the axis of said shaft, a second vertical member pivotally mounted intermediate its length in the other end of said arm, parallel linkage means extending between said members for maintaining said members parallel, plural take-out tongs mounted to said second member and counterweight means connected to said arm and extending out beyond the axis of said shaft on the side opposite said take-out tongs.

2. The apparatus of claim 1, wherein said first and second vertical members are sprockets and said parallel linkage means comprises an endless chain extending about said sprockets.

3. The appratus of claim 2, further including means engaging said chain in the upper run between said sprockets for maintaining a predetermined tension in said chain.

4. The apparatus of claim 3, wherein said chain tension maintaining means comprises a third sprocket in engagement with said chain and means for biasing said sprocket with a predetermined force.

5. The apparatus of claim 4, wherein said biasing means comprises a spring-loaded plunger having one end in engagement with a crank arm supporting the third sprocket, the other end of said plunger extending into a hollow nut which serves as the spring stop.

6. The apparatus of claim 5, wherein said hollow nut is threaded in said arm and adjustment of said nut will adjust the spring tension to compensate for sprocket and chain wear.

7. The apparatus of claim 6, wherein said nut is adjusted by insertion of hex wrench into the hollow end thereof and may be rotated until the plunger fills the wrench opening, thereby assuring that over-tensioning does not occur.

8. The apparatus of claim 1, wherein said counterweight comprises a hollow member cast with said arm, and a dense medium filling said hollow member.

9. The apparatus of claim 8, wherein said hollow member is in the form of a semi-circular chamber extending out from and coaxial with said shaft.

10. The apparatus of claim 8, wherein said dense medium is lead.

11. The apparatus of claim 1, wherein said counterweight is formed of a mass extending in the opposite direction to the arm that supports the tongs, said mass being generally semi-circular with respect to the axis of said shaft, whereby during movement of the arm about the axis of said shaft said weight acts to balance the weight of the arm and tongs carried thereby.

12. A take-out arm for a glass ware forming machine comprising a generally horizontally extending casting having a pair of parallel shaft accommodating openings formed therein at spaced apart ends thereof, a fixed support shaft extending into one of said openings, a first sprocket fixed to said support shaft and positioned within said casting, a second shaft rotatably mounted in said other opening in said casting, a second sprocket fixed to said second shaft and positioned within said casting, an endless chain extending about said sprockets, a plural container take-out tong mechanism connected to said second sprocket, means connected to said casting for rotating said casting about the axis of said first sprocket, and a counterweight fixed to said casting in opposed coaxial arrangement with respect to the axis of said first sprocket, whereby rotation of the casting through 180° will move the take-out tongs through an arc about the axis of said first sprocket while the tongs remain in an upright attitude during the rotation.

13. The apparatus of claim 12, further including means engaging said chain for maintaining tension of a predetermined amount in said chain.

14. The apparatus of claim 13, wherein said means for maintaining tension in said chain comprises a third sprocket in engagement with said chain and adjustable spring means biasing said sprocket against said chain.

15. The apparatus of claim 13, wherein said means for maintaining tension comprises a spring having a force equal to or greater than the pendulum force created by the take-out tong.

* * * * *